Patented Nov. 21, 1950

2,530,987

UNITED STATES PATENT OFFICE 2,530,987

PRODUCTION OF UNSATURATED ALDEHYDES

Henry O. Mottern, Hillside, and Vincent F. Mistretta, Fanwood, N. J., assignors to Standard Oil Development Company, a corporation of Delaware No Drawing. Application December 13, 1945, Serial No. 634,885

6 Claims. (Cl. 260—601)

This invention relates to a process for the manufacture of unsaturated aldehydes by a catalytic condensation of two molecules of the same or different aldehydes in the presence of hydrogen and a specially prepared catalyst.

An object of this invention is to prepare unsaturated aldehydes by a one-step reaction which by previous methods would have required two or more steps.

Another object of this invention is to prepare a catalyst which promotes the reaction between two molecules of the same or different aldehydes in the presence of hydrogen to yield an unsaturated aldehyde.

Still another object of this invention is to react two molecules of the same or different aldehydes in a one-stage process to form an unsaturated aldehyde substantially directly.

A still further object of this invention is to provide a process for the manufacture of unsaturated aldehydes, which process may be operated in a continuous manner.

Still other objects will be apparent to those skilled in the art from the following detailed description of the invention and from the claims.

Heretofore, unsaturated aldehydes have been made by a number of procedures but it has been difficult to isolate the desired unsaturated aldehyde product because the crude products were mixtures of a number of reaction products in which the unsaturated aldehyde resulting from the condensation of two molecules of aldehyde was not present in a major amount. The processes described in the prior art for making unsaturated aldehydes are generally two-step reactions, the first step being an aldol condensation in which the product is a hydroxy aldehyde, and the second step being a dehydration to the unsaturated aldehyde. The disadvantage of the two-step method is that it results in poor yields of the desired product. The prior art also discloses a method of making unsaturated aldehydes by a one-stage process in which the vapors of the aldehydes are passed over a catalyst containing a metal oxide and a dehydrating substance such as silica or alumina gel. This process, however, results in low yields.

It has now been discovered that unsaturated aldehydes can be made directly by the condensation of two molecules of the same or different aldehydes in the presence of a catalyst prepared by mixing an oxide selected from group II and an oxide selected from group V of the periodic system. By the use of this catalyst mixture substantial yields of the desired unsaturated aldehyde are obtained and a number of unsaturated aldehydes not previously available can be produced. This invention is practiced by passing the aldehyde or aldehydes over the catalyst while in the vapor form and in the presence of hydrogen. The temperature range at which the vapors are maintained may vary somewhat depending upon the aldehyde or aldehydes used but it is, in general, within the range of 200 to 600° C. A requirement of the temperature chosen is that it be below the decomposition temperature for any reactant and that it be as far removed as possible from the temperature which promotes condensations of a high order which would yield a product containing more than two of the molecules of the original reactant or reactants.

It is necessary in the practice of this invention that the vapors of the aldehyde or aldehydes be mixed with hydrogen before their passage over the catalyst. Hydrogen has the effect of activating the catalyst and when hydrogen is not present, the amount of condensate is negligible. The aldehyde or aldehydes and hydrogen are preferably kept in mol to mol proportion, but it may be desirable in some cases to increase the proportion of the hydrogen and it has been found that the proportion of hydrogen can be extended to 10 mols per mol of reactant or reactants without a reduction in the efficiency of the condensation.

The catalyst used in this process is prepared by mixing oxides of the second and fifth group of the periodic system. The oxide chosen from group II preferably forms the major portion of the oxide mixture, that is, it is preferred to have this oxide present in the mixture of oxides in the percentage of at least 50% by weight. It is possible, however, to use greater than 50% by weight of the oxide selected from group V. A typical catalyst which satisfactorily promotes the condensation is made by mixing 94 parts of zinc oxide and 6 parts of bismuth trioxide. An oxide selected from group II will catalyze the condensation without the addition of an oxide selected from group V, but the yield of condensate in this case is low. The activity of the mixed oxides is substantially greater than that of a single oxide selected from group II of the periodic table and the active life of the mixed oxides is much longer. In preparing the catalyst, the oxides are intimately mixed and this can be done by making an aqueous slurry followed by removal of water and pulverization to yield a dry powdered catalyst. It is preferred to deposit the above mixture of oxides on an inert carrier such as diatomaceous earth, bentonite, talc, metallic machine turnings, etc. A catalyst prepared in the above manner does not require the presence of a special dehydration promoting substance such as silica, alumina gel or activated alumina because the catalyst is active at temperatures high enough for rapid dehydration and the condensation product is substantially free from hydroxy aldehydes.

This invention applies particularly to acetaldehyde, propionaldehyde and butyraldehyde. It also applies to aralkyl aldehydes and, in general, to any aldehyde which has a —CH₂— group attached to the

Some of the unsaturated aldehydes prepared according to this invention are known chemical compounds, but due to the high activity of the catalyst, this invention makes available a number of unsaturated aldehydes possible only by circuitous steps of synthesis and also some new to the art.

The condensation may be made at atmospheric pressure or at elevated pressures.

The reaction may be carried out in any suitable apparatus. The aldehyde or aldehydes may be vaporized prior to their entrance into the catalyst chamber or may be introduced as liquids and be vaporized by contact with solid catalyst. Hydrogen may be introduced into the aldehyde vapor before the vapor enters the catalyst chamber or the hydrogen may be introduced into the catalyst chamber along with the liquid aldehyde or aldehydes. It is essential that the mixing of hydrogen be conducted in such a manner that the reactant vapors are not altered with respect to temperature to such a degree that the desired reaction temperature is not obtained in the catalyst chamber. If desired, suitable provision for passing the incoming materials in heat exchange with the outgoing reaction products can be provided. The catalyst chamber may be connected to a condenser and this unit may be then connected to distillation apparatus, polymerization equipment or other such apparatus, depending upon the subsequent treatment which it is desired to apply to the unsaturated aldehyde.

The unsaturated aldehydes produced by this invention have a variety of uses, such as perfume bases, plasticizers, insecticides, etc. They may also be used to produce normal alcohols by reduction with hydrogen, as intermediates in condensation and alkylation type reactions, and as starting materials in the synthesis of other organic compounds of great variety.

The aldehyde or aldehydes are contacted with the catalyst at a rate which may vary widely but the preferred rate is within the range of 0.25 to 2.0 volumes of liquid aldehyde per volume of catalyst per hour. When the rate at which the aldehyde or aldehydes is passed through the catalyst chamber is low in the range above there is more condensation taking place than when the rate is higher. When the rate is substantially lower than 0.25, the products may be the result of the condensation of more than two molecules of starting material and there may be resinification and decomposition of the unsaturated aldehyde. When the rate is very high there is less conversion per pass-through.

The temperature used for the condensation may be between 200 and 600° C., however, the preferred temperature range is from 350 to 450° C. If the temperature rises higher than 600° C., substantial amounts of condensate resulting from the interaction of more than two molecules of aldehyde or aldehydes may be present in the product.

The invention is illustrated by the following examples but it is to be understood that these examples are set forth only for the purpose of illustration and are not to be construed as limiting the invention in any way.

*Example I*

A mixture of oxides comprising 94% by weight of zinc oxide and 6% by weight of bismuth trioxide was slurried with water and deposited on steel machine turnings. The coated turnings were dried and placed in an iron tube. The volume of the turnings was 120 cc. The tube containing the catalyst was heated in a metal bath of 750° F. and held at that temperature throughout the course of the reaction. 950 grams of acetaldehyde were fed into the tube at a rate of 0.75 volume of liquid acetaldehyde per volume of catalyst per hour. Hydrogen was fed into the catalyst containing tube at a rate which represented one mol of hydrogen passing through the tower for each mol of aldehyde passing through. The vapors issuing from the catalyst tube were condensed and the crude condensate was distilled. 722 grams of acetaldehyde were recovered from the distillation along with 182 grams of crotonaldehyde. 182 grams of crotonaldehyde is equivalent to 229 grams of acetaldehyde, which is 24.1% of the acetaldehyde fed into the catalyst tube.

*Example II*

94 per cent by weight of magnesium oxide and 6 per cent by weight of bismuth trioxide were slurried with water and deposited on steel turnings. The coated turnings were dried. A tube containing 120 cc. of the coated turnings was heated in a metal bath to 750° F. and held at that temperature throughout the course of the reaction. Liquid acetaldehyde at the rate of 180 cc. per hour was fed into the catalyst containing tube. Hydrogen at the rate of 1½ cubic feet per hour was fed at the same time into the reaction tube. The vapors issuing from the reaction tube were condensed and when 900 cc. of liquid had been obtained no more acetaldehyde was fed into the tube. The 900 cc. of liquid was fractionated and after unchanged acetaldehyde had been distilled, 46 cc. representing 5.1 volume per cent of crotonaldehyde fraction was obtained which was approximately 85% crotonaldehyde.

*Example III*

A mixture of oxides composed of 94 per cent by weight of magnesium oxide and 6 per cent by weight of vanadium pentoxide was slurried with water and deposited on steel turnings which turnings were then dried. A tube containing 120 cc. of the turnings was heated in a metal bath to 750° F. and held at that temperature during the course of the reaction. Liquid acetaldehyde was fed into the tube at the rate of 180 cc. per hour while hydrogen at the rate of 1½ cubic feet per hour was also fed into the tube. The vapors issuing from the reaction tube were condensed and when 700 cc. of liquid were obtained addition of acetaldehyde to the tube was stopped. 690 cc. of the liquid was fractionated and after unchanged acetaldehyde had been distilled 21 cc. of a crotonaldehyde fraction was obtained which was approximately 85% crotonaldehyde. The 21 cc. crotonaldehyde fraction represents 3 volume per cent of the liquid condensate.

This invention contemplates a process for the production of unsaturated aldehydes wherein a molecule of one aldehyde is reacted with another molecule of the same aldehyde or where two molecules of different aldehydes react. In the case where the molecule of one aldehyde reacts with a molecule of a different aldehyde, the product is a mixture of unsaturated aldehydes which represents a reaction of two molecules of each of the aldehydes involved, as well as one molecule of one aldehyde with a molecule of the other aldehyde. The separation of the unsaturated aldehydes produced in the latter case is not difficult when two aldehydes which have a difference of two or more carbons are used because the boiling points of the unsaturated aldehydes produced are far enough apart so that efficient fractionation can be made.

The process contemplated by this invention can be successfully and economically operated in a continuous manner. A substantial portion of the aldehyde or aldehydes are unchanged by passage through the catalyst chamber and they can be purified from the products of the reaction and recycled to the catalyst chamber with hydrogen to form more unsaturated aldehyde. In a continuous process an aldehyde such as acetaldehyde would be fed to a vaporizer and preheater in order to bring the temperature of the vapors to 750° F. The vapors would then be mixed with hydrogen and conducted over the catalyst bed while the temperature was maintained in the desired range. The aldehyde would be fed through the catalyst chamber at a rate of one-half to three volumes of liquid aldehyde per volume of catalyst per hour. The hydrogen which is mixed with the gases entering the catalyst chamber is recovered from the said chamber without any substantial loss in quantity, therefore, upon recycling the unchanged aldehyde or aldehydes, the hydrogen may also be recycled and very little new hydrogen need be added to the gases entering the catalyst chamber. The reaction products may be separated from the unreacted aldehyde vapors and the hydrogen by cooling the gases issuing from the catalyst chamber below the temperature at which the reaction products would condense to liquids but above the temperature at which the unreacted aldehyde or aldehydes would vaporize and thus the reactants could always be maintained at a temperature above the temperature at which they vaporize during the recycling to the catalyst chamber. This contributes to the efficiency of the process in that there is a substantial saving in the heat required to originally raise the reactant from a liquid to a vapor at a temperature required by the reaction.

The hydrogen gas may be recovered for recycling to the catalyst chamber or may be recovered and used for the reduction of the condensate to the saturated aldehyde or to a primary alcohol. Water scrubbing is a satisfactory method for the removal of unchanged aldehyde from the hydrogen in the case where the hydrogen is to be used in a subsequent hydrogenation step.

What is claimed and desired to secure by Letters Patent is:

1. A process for the production of an unsaturated aldehyde by the reaction of two molecules of acetaldehyde which comprises preparing a vapor mixture consisting of acetaldehyde vapor and hydrogen, reacting the mixture at a temperature of 400° C. and at atmospheric or higher pressure in the presence of a catalyst consisting of a mixture of oxides comprising 94% by weight of zinc oxide and 6% by weight of bismuth oxide deposited on steel turnings, and cooling the resulting reaction materials containing unsaturated aldehyde.

2. A process for the reaction of two molecules of aldehyde having a —$CH_2$— group adjacent the —CHO— group which comprises reacting a vaporous mixture of aldehyde and hydrogen at a temperature of 200° C. to 600° C. and at atmospheric or higher pressure in the presence of a catalyst consisting of a major amount of zinc oxide and a minor amount of bismuth oxide, and recovering reaction materials containing unsaturated aldehyde.

3. A process according to claim 2 in which the two molecules of aldehyde are of the same aldehyde.

4. A process according to claim 2 in which the two molecules of aldehyde are of different aldehydes.

5. A process according to claim 3 in which the aldehyde is acetaldehyde.

6. A process according to claim 3 in which equi-molecular amounts of aldehyde and hydrogen are employed.

HENRY O. MOTTERN
VINCENT F. MISTRETTA.

REFERENCES CITED

The following references are of record in the file of this patent:

UNITED STATES PATENTS

| Number | Name | Date |
|---|---|---|
| 2,081,272 | Foster | May 25, 1937 |
| 2,105,540 | Lazier | Jan. 18, 1938 |
| 2,230,591 | Fischer | Feb. 4, 1941 |
| 2,245,582 | Gallagher | June 17, 1941 |
| 2,345,111 | Grundmann | Mar. 28, 1944 |

OTHER REFERENCES

Komarewsky et al., J. A. C. S., 65 pages, 547 to 548.

Ser. No. 353,384, Mueller-Cunradi. (A. P. C.), published Apr. 20, 1943.